Nov. 3, 1953    M. B. BEEBE    2,657,939
ROCKING AXLE WITH STEERABLE STUB AXLES
Filed March 27, 1951    3 Sheets-Sheet 1
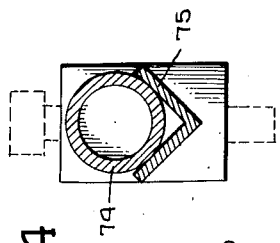
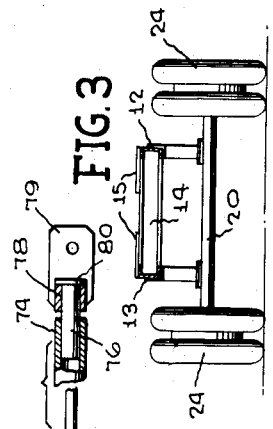
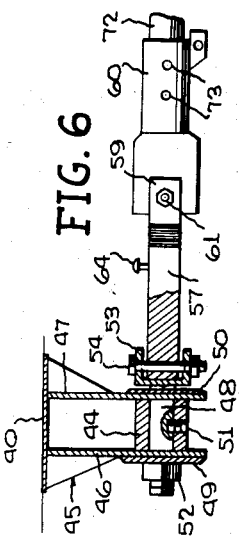
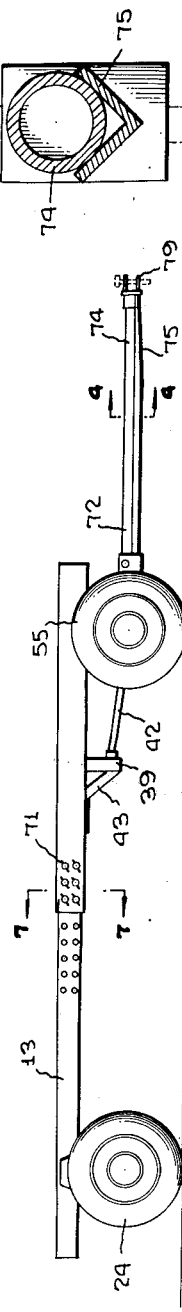
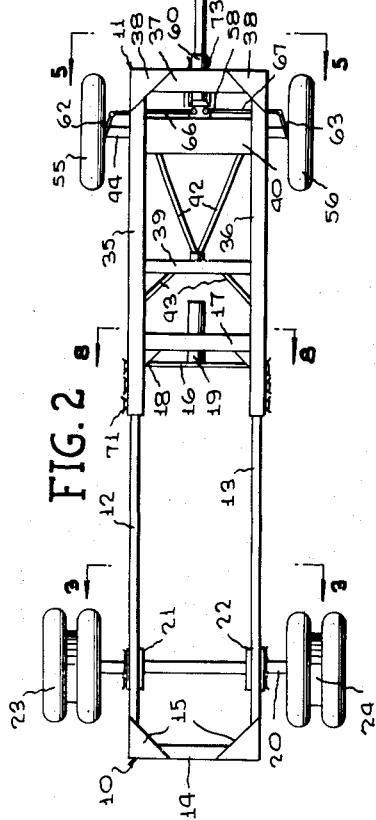
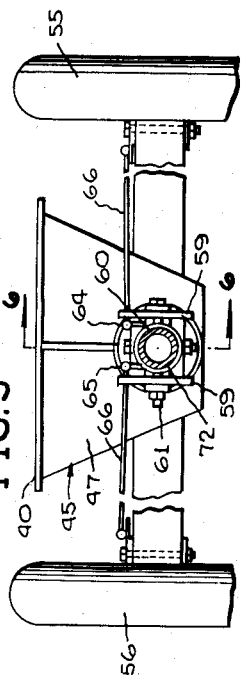
INVENTOR.
MONROE B. BEEBE
BY
McMorrow, Berman + Davidson
ATTORNEYS

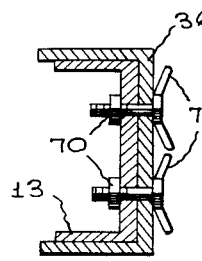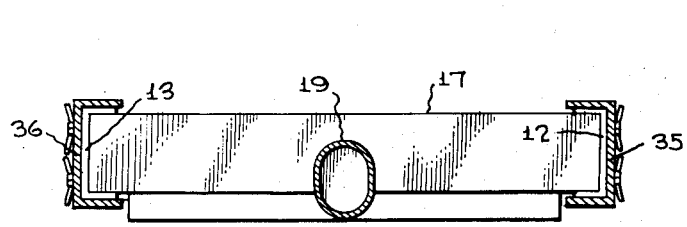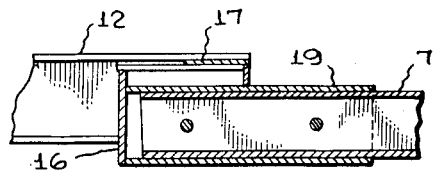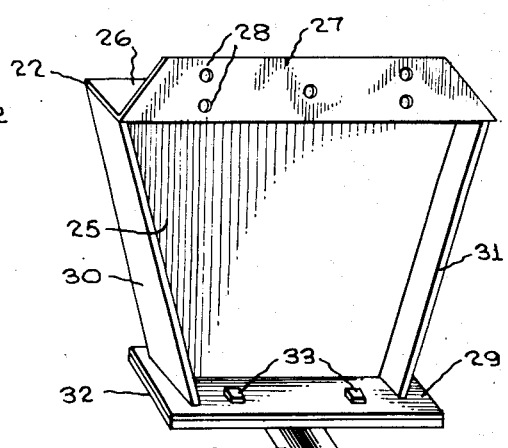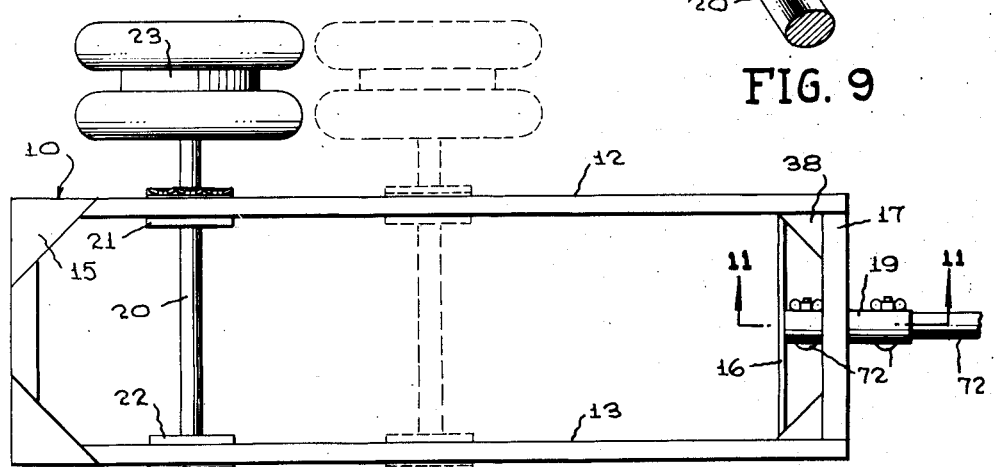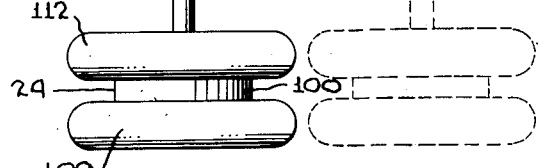

Nov. 3, 1953 M. B. BEEBE 2,657,939
ROCKING AXLE WITH STEERABLE STUB AXLES
Filed March 27, 1951 3 Sheets-Sheet 3

INVENTOR.
MONROE B. BEEBE
BY
McMorrow, Burman & Davidson
ATTORNEYS

Patented Nov. 3, 1953

2,657,939

UNITED STATES PATENT OFFICE 2,657,939

ROCKING AXLE WITH STEERABLE STUB AXLES

Monroe B. Beebe, Old Lyme, Conn.

Application March 27, 1951, Serial No. 217,832

2 Claims. (Cl. 280—103)

1

This invention relates to trailer vehicles, and more particularly to an adjustable trailer vehicle usable as either a two-wheel or a four-wheel trailer for agricultural and similar uses.

It is among the objects of the invention to provide an improved trailer vehicle provided in two separate parts including a front part and a rear part which, when secured together, constitute a four-wheeled trailer, and of which the rear part alone constitutes a two-wheeled or semi-trailer, which is adjustable in length when used as a four-wheeled trailer and has an adjustably mounted rear axle which may be moved forwardly or rearwardly, particularly when the trailer is converted between its two-wheeled and four-wheeled forms, to properly balance a trailer-carried load, which has a rockable front axle and steerable front wheels, which has a coupling tongue connectible to either the front part or the rear part of the trailer, which has double-tired rear wheels especially designed for agricultural use and for quick and easy changing of the tires, and which is simple and durable in construction, economical and easy to manufacture by welding or equivalent means from standard structural iron stock, and easily adjustable and interchangeable with simple and readily available tools.

Other objects and advantages will become apparent from a consideration of the following description and the appended claims in conjunction with the accompanying drawings, wherein:

Figure 1 is a side elevational view of a trailer vehicle illustrative of the invention;

Figure 2 is a top plan view of the trailer vehicle illustrated in Figure 1;

Figure 3 is a transverse cross-sectional view on the line 3—3 of Figure 2;

Figure 4 is a cross-sectional view on an enlarged scale on the line 4—4 of Figure 1;

Figure 5 is a cross-sectional view on an enlarged scale on the line 5—5 of Figure 2;

Figure 6 is a fragmentary cross-sectional view on the line 6—6 of Figure 5;

Figure 7 is a cross-sectional view on an enlarged scale on the line 7—7 of Figure 1;

Figure 8 is a transverse cross-sectional view on an enlarged scale on the line 8—8 of Figure 2;

Figure 9 is a perspective view of a rear axle mounting bracket constituting an operative component of the vehicle;

Figure 10 is a top plan view of the rear portion of the vehicle;

Figure 11 is a cross-section view on an enlarged scale on the line 11—11 of Figure 10;

2

Figure 12:
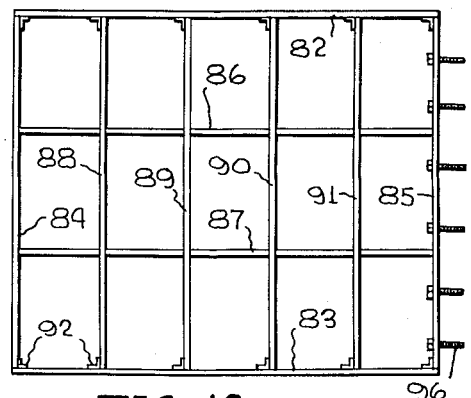
Figures 13, 14, 15:
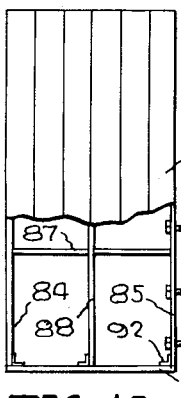
Figure 16:
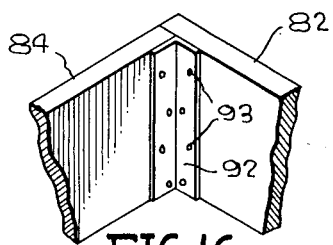
Figure 17:
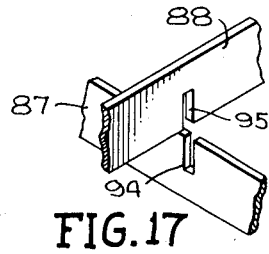
Figure 18:
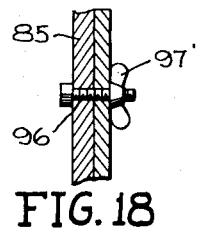
Figure 19:
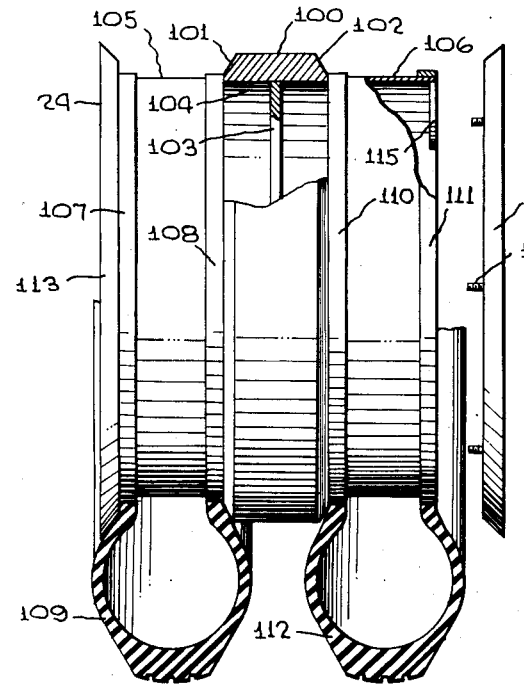
Figure 20:
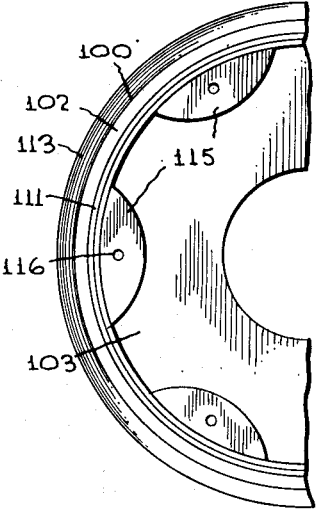

Figure 12 is a top plan view of a platform section frame;

Figure 13 is a top plan view of a platform section shorter than the frame section illustrated in Figure 12 with a portion of the flooring broken away to illustrate the frame of the section;

Figure 14 is a top plan view similar to Figure 13 of a still shorter platform section;

Figure 15 is a top plan view of a platform section shorter than the section illustrated in Figure 14;

Figure 16 is a perspective view of a fragmentary portion of a platform section frame showing the construction of a corner of the frame;

Figure 17 is a perspective view of a fragmentary portion of a platform section frame showing the construction of an intermediate portion of the frame;

Figure 18 is a transverse cross-sectional view of the contacting sides of two adjoining platform section frames;

Figure 19 is a diametrical cross-sectional view through a vehicle rear wheel; and Figure 20 is an end elevational view of a fragmentary portion of one of the rear wheels.

With continued reference to the drawings, the trailer vehicle therein illustrated has a rear frame section of rectangular shape, generally indicated at 10, and a front frame section, also of rectangular shape, generally indicated at 11.

The rear frame section 10 comprises spaced apart and substantially parallel frame side members 12 and 13 of channel-shaped cross-section with their web portions disposed at their outer sides remote from each other. A rear cross member 14 is connected at its respectively opposite ends to the rear ends of the side members 12 and 13, and triangular gusset plates, as indicated at 15, are secured to the rear corners of the frame section 10 overlying the interconnected end portions of the side members 12 and 13 and the rear cross-member 14.

A plate 16 extends transversely between the side members near the ends of the side members remote from the cross-member 14 and is secured at its respectively opposite ends to the side members, this plate being so positioned that its ends extend transversely of the width of the side members substantially perpendicular to the longitudinal center lines of the latter. A front cross-member 17 comprising a structural iron shape extends transversely between the side members 12 and 13 at a location spaced from the side of the plate 16 remote from the rear cross-member 14, and is also secured at its opposite ends to the side members 12 and 13. Triangular gusset plates 18, disposed one at each front corner of the rear frame section, reinforce the connections between the side members 12 and 13 and the front cross-member 17.

A tubular tongue socket 19 is secured at one end to the plate 16 substantially at the mid-length location of the latter and at the side of the plate remote from the rear cross-member 14, and this socket extends through a notch provided in the front cross-member 17 and is rigidly secured to this front cross-member.

A rear axle 20 extends transversely of the rear frame section 10 below the latter and is secured to the side members 12 and 13 by bracket structures 21 and 22, respectively. Rear wheels 23 and 24 are journaled on the rear axle 20 at the respectively opposite ends of the latter and at the outer sides of the adjacent side frame members 12 and 13.

The two rear axle-attaching brackets 21 and 22 are substantially identical in construction, and a detailed illustration and description of one only is considered sufficient for the purposes of the present disclosure. The bracket 22 has been selected for such detailed illustration and description and is illustrated in detail in Figure 9.

The bracket 22, as particularly illustrated in Figure 9, comprises a plate 25 of trapezoidal shape which depends from the frame side member 13 substantially perpendicular to a plane including the center lines of the frame members 12, 13 and 14. A top plate 26 is secured at one edge to the longer, upper edge of the plate 25, and this top plate 26 has along its other longitudinal edge an upwardly extending flange 27 providing with spaced apart apertures 28. A plate 29 of elongated, rectangular shape is secured adjacent one longitudinal edge to the lower, shorter edge of the trapezoidal plate 25 and two flange plates 30 and 31 extend one along each side edge of the plate 30 between the corresponding ends of the plates 26 and 29. The flange plates 30 and 31 are disposed substantially perpendicular to the plate 25 and extend from the same side of this plate as that from which the plates 26 and 29 extend, and are joined at their upper ends to the plate 26 at the respectively opposite ends of the latter and are joined at their lower ends to the plate 29 near the respectively opposite ends of this plate. This provides a bracket of reinforced, box-shaped construction.

A rectangular plate 32 is welded or otherwise rigidly secured to the rear axle 20 near the mid-length location of the plate, and this plate 32 underlies the plate 29 and is secured thereto by suitable means, such as the bolts 33 extending through registering apertures in the two plates 29 and 32.

The side member 13 is provided with spaced apart apertures therealong, and the bottom edge of this side member rests on the upper surface of the plate 26 with the flange 27 disposed at the outer side of the web of the side member 13. Suitable bolts extend through registering apertures in the side member 13 and in the flange 27 to secure the bracket 22 rigidly to the side member 13. By means of these bolts, the bracket may be secured to the side member at different locations along the side member, the two most important positions being one in which the axle is positioned near the rear cross-member 14, as illustrated in full lines in Figure 10, and one in which the axle is positioned near the mid-length location of the two side members 12 and 13, as indicated in broken lines in Figure 10.

The front frame section 11 has two spaced apart and substantially parallel side members 35 and 36, also of channel-shaped cross-section, and sufficiently larger than the side members 12 and 13 of the rear frame section so that the side members 12 and 13 can be telescopically received in the corresponding side members 35 and 36 of the front frame section, as is clearly illustrated in Figure 2.

A front cross-member 37 extends transversely between the side members 35 and 36 at the front ends of these side members and is secured at its respectively opposite ends to the ends of the corresponding side members. Triangular gusset plates 38 overlie the adjacent end portions of the side members 35 and 36 and the front cross-member 37, and are rigidly secured to the side members and cross-member by suitable means, such as welding, to reinforce the connection between the front cross-member and the two side members.

A rear cross-member 39 for the front frame section extends transversely between the side members 35 and 36 intermediate the length of these side members and is disposed substantially parallel to the front cross-member 27, and a plate 40 extends between and is secured to the lower flanges of the two channel-shaped side members 35 and 36 between the cross-members 37 and 39 and adjacent the cross-member 37, with its major surfaces disposed substantially parallel to the bottom flanges of the side members.

Suitable diagonal braces or triangular gusset plates 43 extend rearwardly from the cross-member 39 to the side members 35 and 36 and are joined to this cross-member and the side members to reinforce the connection between the side members and the rear cross-member 39.

A front axle 44 is disposed below the plate 40 of the front frame section, and the front frame section is mounted on this front axle by a bracket structure particularly illustrated in Figures 5 and 6.

The bracket structure, generally designated at 45, supporting the front frame section 11 on the front axle 44 comprises two plates 46 and 47 of trapezoidal shape having their upper, longer edges extending along the under side of the plate 40 near the respectively opposite side edges of the plate 40 and secured to the plate 40 by suitable means, such as welding. The two plates 46 and 47 are disposed in spaced apart and substantially parallel relationship to each other and transversely of the front frame section 11 and depend from the plate 40 with their shorter, lower edges disposed somewhat below the front axle 44.

A pair of diagonal braces 42 are connected at their rear ends to the cross-member 39 substantially at the mid-length location of this cross-member and extend forwardly in mutually divergent relationship to the bracket plate 46 to which they are connected at their forward ends near the respectively opposite ends of this plate.

The front axle 44 is received between the plates 46 and 47 at a location spaced from the plate 40, and is provided substantially at its mid-length location with a transversely extending aperture. The plates 46 and 47 are provided with apertures registering with the aperture in the front axle, and a pivot pin 48 extends through the registering apertures in the plates 46 and 47 and the front axle 44 to pivotally connect the front axle to these plates for rocking movement relative to the front frame section 11 about the pivot pin 48, the axle of which is disposed below and substantially parallel to the longitudinal center line of the front frame section.

The plates 46 and 47 are thickened around the apertures therein, as indicated at 49 and 50, to provide bearings for the pin 48, and a set screw 51 is threaded through a tapped hole in the front axle and engages the pin 48 to maintain the pin against rotation relative to the front axle.

The end of the pin 48 projecting from the rear plate 46 is screw-threaded and receives a nut 52 which bears against the thickened portion of the plate 46 and the other or front end of the pin is provided with a yoke structure 53 having registering apertures therein which receive a pivot pin 54, the axis of which is substantially perpendicular to the axis of the pivot pin 48 and at right angles to the longitudinal center line of the front axle 44.

Front wheel spindles are pivotally mounted, one on each end of the front axle 44, and front wheels 55 and 56 of an existing type are journaled one on each of the spindles.

A drawbar 57 is received at one end in the yoke 53 and pivotally connected to the pivot pin 48 by the pivot bolt 54 and is provided at its opposite end with a bifurcated formation 58 providing a rectangular opening. Two plates 59 are rigidly secured to the drawbar 57 in the openings provided by the bifurcated portion 58 at respectively opposite sides of this opening, and a tongue socket 60 is received in the opening between the two plates 59 and pivotally connected to the drawbar by a pivot bolt 61 which extends through registering apertures in the bifurcated portion of the drawbar and in the portion of the socket 60 received in the opening provided by the bifurcated portion of the drawbar. The pivotal axis of the bolt 61 is perpendicular to the axes of both the pivot pin 48 and the pivot bolt 54.

Steering arms 62 and 63 are secured one to each of the front wheel spindles at the respectively opposite ends of the front axle 44 and two ball formations 64 and 65 are provided in side-by-side relationship on the drawbar 57 intermediate the length of the latter and project upwardly from the upper surface of the drawbar. A drag link 66 connects the distal end of the steering arm 62 to the adjacent ball formation 64, and a similar drag link 67 connects the distal end of the steering arm 63 to the adjacent ball formation 65, so that the front wheels will be steered when the drawbar 57 is swung about the axis of the pivot bolt 54.

Since the pivot pin 48 is secured to the front axle 44 against relative rotation, the drawbar 57 will turn with the rocking movements of the front axle, and the geometry of the steering mechanism will thus not be disturbed by the rocking movements of the front axle of the vehicle.

In the arrangement illustrated in Figures 1 and 2, the side frame members 12 and 13 are telescopically received at their front ends in the rear ends of the side frame members 35 and 36 of the front frame section, and the two frame sections are secured together by bolts 70, see Figure 7, extending through registering apertures in each two adjacent side frame members.

At least one pair of the side frame members is provided with a large number of spaced apart apertures, so that the bolts can be extended through selected apertures to vary the total length of the frame comprising the rear section 10 and the front section 11. These bolts have wing heads 71, and are threaded into nuts welded to the inner sides of the rear frame side members 12 and 13 to secure the two frame sections together in adjusted position relative to each other.

Also, in this arrangement, a tongue 72 is received at one end in the tongue socket 60 and secured therein by bolts 73 extending transversely of the socket and tongue through registering apertures provided therein.

The tongue is an elongated, tubular member 74 having a length of angle iron 75 extending along its lower side. The tubular member is received between the legs of the angle iron, as particularly illustrated in Figure 4, and the legs of the angle iron are securely welded to the tubular member to reinforce the tubular member against bending when loads are applied thereto, particularly when the vehicle is being used as a two-wheeled or semi-trailer.

A cylindrical pin 76 is secured at one end in the tubular member 74 at the end of the latter remote from the socket 60, and this pin projects outwardly of the adjacent end of the tubular member. A clevis 79 has at one end a cylindrical sleeve portion 78 which receives the portion of the pin 76 projecting from the tubular member 74 and is rotatable on this outwardly projecting portion of the pin. A washer 80 is secured on the pin 76 near the end thereof remote from the tubular member 74, and provides an abutment for the clevis 79. This swivel connection permits the tongue to rotate freely relative to the clevis, so that the front axle can rock about the axis of the pin 48 without rotating the clevis which is attached to a towing vehicle, such as a tractor or truck.

By removing the bolts 70, the rear frame section 10 can be completely separated from the front section 11, and the rear unit including the frame section 10, rear axle 20 and rear wheels 23 and 24 can then be used as a two-wheeled trailer or semi-trailer whenever operating conditions are more favorable to the use of such a trailer.

When the rear unit is used as a two-wheeled trailer, the rear axle 20 is moved forwardly by unbolting the rear axle brackets 21 and 22, moving these brackets from their locations adjacent the rear end of the rear frame section 10 substantially to the mid-length location of this frame section, and bolting the brackets to the side members of the frame section at the new locations, as indicated in dotted lines in Figure 10. The tongue 72 is then inserted in the tongue socket 19 carried by the rear frame section at the front end thereof, and the front clevis 79 of the tongue is secured to the towing vehicle. The socket 19 is rigidly secured to the rear frame section, so that the tongue will support the front end of this section against vertical movement either upwardly or downwardly, and the tongue structure including the tubular portion 74 and the angle iron portion 75, welded to the tubular portion, is effective to resist the bending stresses imposed on the tongue.

Figures 12, 13, 14 and 15 show platform sections of different lengths which can be combined in different ways to accommodate the length of the platform to any adjusted length of the vehicle frame. It is contemplated that the length of the frame can be varied by approximately two-foot intervals, and the platform sections are, therefore, preferably provided in lengths which are multiples of two feet.

The longer platform section, illustrated in Figure 12, has a rectangular frame including side rails 82 and 83 disposed in spaced apart and substantially parallel relationship and substantially coterminus with each other, two end rails 84 and 85 each connected at its opposite ends to the corresponding ends of the two side rails 82 and 83, longitudinally extending intermediate members 86 and 87 disposed substantially parallel to the side rails 82 and 83 and spaced at substantially equal distances from the two side rails and from each other, and transverse members or battens 88, 89, 90 and 91 extending between the two side rails substantially parallel to the two end rails and spaced at substantially equal distances from the two end rails and from each other.

The members of the platform section frame are preferably formed of pieces of hard wood of elongated, rectangular cross-sectional shape, and these members are connected together at their ends by angle iron connectors, as particularly illustrated in Figure 16, and designated at 92. Each angle iron connector is provided in each leg with a plurality of spaced apart apertures and is secured to the associated platform frame members by suitable fasteners, such as the screws or bolts 93, extending through the apertures in the connector and engaged in the wooden members.

The stringers 86 and 87 and the battens 88 to 91, inclusive, are provided at their intersection locations with rectangular notches, as particularly illustrated in Figure 17, and designated at 94, for one of the stringers, for example, the stringer 87, and at 95 for one of the battens, for example, the batten 88. The members are illustrated as being of the same width, and each notch extends half-way through the width of the corresponding member, so that when each of two intersecting members is engaged in the notch of the corresponding member, the upper edges of all of the platform frame members are substantially in one common plane, and the lower edges are in another common plane substantially parallel to the first-mentioned plane.

The platform frame section illustrated in Figure 13 is similar in construction to that illustrated in Figure 12 and described above, except that the section illustrated in Figure 13 has only one intermediate batten. The section illustrated in Figure 14 is of the same construction, except that it has no intermediate batten, the distance between its two end members being the same as the distance between two adjacent battens or between a batten and the adjacent end member of the platform frame sections illustrated in Figures 12 and 13. The section illustrated in Figure 5 has a length less than the distance between two adjacent battens and includes a single end member from one side of which the side rails and stringers extend. This section is used only for filling out the ends of the platform and has a length substantially equal to the interval of adjustment, such as two feet, of the length of the trailer frame combination.

Each end member of the various platform frame sections is provided with spaced apart apertures, and these apertures are so located that when two platform frame sections are placed in end-to-end relationship, the apertures in one end rail of one of the sections will each register with a corresponding aperture in the contiguous end rail of the adjacent section.

Bolts, as indicated at 96, are extended through the registering apertures in the two contiguous end rails and wing nuts, as designated at 97', are threaded one on each of these bolts to firmly secure the two platform frame sections rigidly together.

The upper surface of each platform frame section is covered by suitable flooring, as designated at 97 in Figures 13 and 14.

The width of the platform sections is greater than the width of the frame sections 10 and 11 of the vehicle, so that the edges of the platform extend outwardly beyond the side rails of the two frame sections and overlie the wing formations 71, so that these formations will not have a tendency to catch in clothing or present any hazard of personal injury to persons using the vehicle.

The platform sections are secured to the vehicle frame by suitable means, as by clamp bolts, not illustrated, secured to the intermediate stringers of the platform sections and extending under the side rails of the frame sections of the vehicle.

As stated above, the rear wheels 23 and 24 are of special construction, and one of these wheels, for example, the wheel 24, is illustrated in detail in Figures 19 and 20.

The rear wheel, as illustrated in Figures 19 and 20, comprises a central ring 100 of cylindrical shape having outwardly beveled edges 101 and 102. A disc 103 is received in the ring 100 and extends transversely of the ring at the mid-length location of the latter. At its periphery the disc 103 is welded to the inner surface of the ring, as indicated at 104, and at its center, the disc carries a hub, not illustrated, which receives an arbor on the corresponding end of the rear axle 20.

Two cylindrical tire rims 105 and 106 are disposed one at each end of the ring 100, and each of these rims has its edge adjacent the ring securely welded to the contiguous edge of the ring, the two rims and the ring being coaxial with each other. The rim 105 has at its respectively opposite edges flat bands 107 and 108 which are raised above the outer surface of the intermediate portion of the rim and receive the beads of a tire 109 mounted on the rim. The rim 106 has corresponding bands 110 and 111 which receive the beads of a corresponding tire 112. The beveled edges of the ring 100 provide retaining walls for the adjacent sides of the tires 109 and 112, and an outer ring 113 is detachably secured to the outer edge of the rim 105 to provide an abutment for the outer side of the tire 109, while a similar outer ring 114 is detachably secured to the outer side of the rim 106 to provide an abutment for the outer side of the tire 112.

As particularly illustrated in Figure 18, inwardly directed lugs 115 are provided at substantially equal intervals around the outer edge of each of the rims 105 and 106, and each of these lugs is provided with a screw-threaded aperture 116. The outer rings 13 and 114 are provided with angularly spaced apart apertures and lug bolts 117 extend through the apertures in the outer rings and are threaded into the apertures in the lugs 115 to detachably secure the outer rings to the corresponding rims to secure the tires on the rear wheels.

With the rear wheel construction particularly illustrated and described, the tires are easy to remove and replace and are spaced apart for efficient operation on soft ground when the vehicle is used for agricultural purposes. If the ground should be sufficiently soft for the tires to sink into the ground, the wide ring 100 will provide additional tread area to support the wheel.

The invention may be embodied in other specific forms without departing from the spirit or essential characteristics thereof, and the present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a trailer vehicle having a frame including side members, a cross member extending transversely of said frame adjacent the front end thereof and secured at its opposite ends to said side members, a pair of plates depending from said cross member in spaced apart relationship to each other and extending longitudinally of said cross member, a front axle disposed between said plates, said axle and said plates having mutually registering apertures therein, a pivot pin extending through said apertures and connecting said axle to said plates for freedom of rocking movement of said axle relative to said frame about said pivot pin, a yoke formation on the front end of said pivot pin, a drawbar pivotally connected at its rear end to said yoke formation, a tongue socket pivotally secured to the front end of said drawbar, front wheel spindles pivotally mounted one on each end of said axle, front wheels journalled one on each of said spindles, steering arms extending one from each of said spindles, and means connecting said drawbar to said steering arms for steering movement of said front wheels upon pivotal movement of said drawbar about the pivotal connection between said drawbar and said pivot pin.

2. In a trailer vehicle having a frame including side members, a cross member extending transversely of said frame near the front end thereof and secured at its opposite ends to said side members, a pair of plates depending from said cross members in spaced apart relationship to each other and extending longitudinally of said cross member, a front axle disposed between said plates, said axle and said plates having mutually registering apertures therein with the aperture in said axle disposed at the midlength location thereof, a pivot pin extending through said apertures and connecting said axle to said plates for freedom of rocking movement of said axle relative to said frame about said pivot pin, a yoke formation on the front end of said pivot pin, a drawbar pivotally connected at its rear end to said yoke formation, a tongue socket pivotally secured to the front end of said drawbar, front wheel spindles pivotally mounted one on each end of said axle, front wheels journalled one on each of said spindles, steering arms journalled one from each of said spindles, and means connecting said drawbar to said steering arms for steering movement of said front wheels upon pivotal movement of said drawbar about the pivotal connection between said drawbar and said yoke formation, said axle being secured to said pin, the pivotal connection between said drawbar and said yoke formation being substantially perpendicular to the axis of said pivot pin and to a plane including the longitudinal center lines of said frame side members, and the axis of the pivotal connection between said drawbar and said tongue socket being substantially perpendicular to the axis of said pivot pin and to the axis of the pivotal connection between said drawbar and said yoke formation.

MONROE B. BEEBE.

References Cited in the file of this patent

UNITED STATES PATENTS

| Number | Name | Date |
|---|---|---|
| 1,028,109 | Hale | June 4, 1912 |
| 1,106,104 | Marx | Aug. 4, 1914 |
| 1,777,090 | Jones et al. | Sept. 30, 1930 |
| 1,953,053 | Linn | Mar. 27, 1934 |
| 2,059,419 | Tuft | Nov. 3, 1936 |
| 2,105,553 | Schroter et al. | Jan. 18, 1938 |
| 2,107,384 | McQueen | Feb. 8, 1938 |
| 2,135,227 | Voorhees | Nov. 1, 1938 |
| 2,232,549 | McNamara | Feb. 18, 1941 |
| 2,272,961 | Brink | Feb. 10, 1942 |
| 2,284,892 | Persinske | June 2, 1942 |
| 2,316,642 | Woodward | Apr. 13, 1943 |
| 2,365,884 | Kucera | Dec. 26, 1944 |
| 2,461,577 | Stark | Feb. 15, 1949 |
| 2,523,790 | Thiel | Sept. 26, 1950 |
| 2,524,633 | Orjala | Oct. 3, 1950 |